United States Patent
Meadors, Jr.

(10) Patent No.: US 7,922,106 B2
(45) Date of Patent: Apr. 12, 2011

(54) VALVED MISTING SYSTEM FOR VEHICLE

(76) Inventor: Leland T. Meadors, Jr., Boyd, TX (US)

(*) Notice: Subject to any disclaimer, the term of this patent is extended or adjusted under 35 U.S.C. 154(b) by 103 days.

(21) Appl. No.: 12/403,396

(22) Filed: Mar. 13, 2009

(65) Prior Publication Data

US 2010/0230514 A1  Sep. 16, 2010

(51) Int. Cl.
- B05B 9/04 (2006.01)
- B05B 1/32 (2006.01)
- B05B 1/30 (2006.01)
- B05B 17/04 (2006.01)
- F28D 5/00 (2006.01)

(52) U.S. Cl. ........ 239/373; 239/538; 239/541; 239/579; 62/304

(58) Field of Classification Search .......... 239/8, 11, 239/172, 176, 284.1, 541, 579, 583, 289, 239/302, 337, 373, 456–459, 537, 13, 538, 239/539, 581.1; 62/304, 306, 314; 169/62

See application file for complete search history.

(56) References Cited

U.S. PATENT DOCUMENTS

| | | | | |
|---|---|---|---|---|
| 6,151,907 A * | 11/2000 | Hale | ............... | 62/314 |
| 6,325,362 B1 * | 12/2001 | Massey et al. | ............... | 261/127 |
| 6,389,835 B1 * | 5/2002 | Uranga | ............... | 62/306 |
| 6,393,857 B1 * | 5/2002 | Malueg | ............... | 62/310 |
| 6,786,701 B1 * | 9/2004 | Huang et al. | ............... | 417/199.1 |
| 2002/0174889 A1 * | 11/2002 | Shugar et al. | ............... | 136/251 |
| 2003/0213257 A1 * | 11/2003 | Madrid | ............... | 62/244 |

* cited by examiner

Primary Examiner — Darren W Gorman
(74) Attorney, Agent, or Firm — Geoffrey A. Mantooth

(57) ABSTRACT

A misting system has a reservoir located above the passenger compartment of a vehicle. The reservoir, which is capable of containing water and compressed gas, has a horizontally sloped bottom wall and a trough located at the bottom of the bottom wall. The trough has a trough wall that is vertically sloped so as to form a console that depends from the bottom of the reservoir. One or more misting nozzles are located in the trough wall and direct mist across the upper portions of the passenger compartment. By providing a trough, the possibility of water sloshing away from the misting nozzles and compressed gas leaking through the misting nozzles is reduced during vehicle movement. A valve is associated with each misting nozzle. The valve allows the regulation of the flow of mist from off, to partially open, to full open.

13 Claims, 3 Drawing Sheets

VALVED MISTING SYSTEM FOR VEHICLE

FIELD OF THE INVENTION

The present invention relates to systems for cooling the occupants of vehicles, and in particular to misting systems.

BACKGROUND OF THE INVENTION

In hot climates, people try various cooling techniques. Examples include staying in the shade and out of direct sunlight, using air conditioning systems, ventilation, etc. One type of cooling system involves the use of water mist. A misting system produces a fine mist of water. The mist enhances evaporative cooling on the skin of a human.

In some instances, it is desirable to equip a vehicle with a misting system. For example, golf carts and tractors typically have passenger compartments that are open to the exterior. Putting a misting system in such a vehicle is a highly effective way to keep the occupants cool.

U.S. Pat. No. 6,151,907 describes a misting system for a vehicle such as a golf cart. The misting system has a reservoir that contains water under pressure. The pressure is provided by compressed air, which compressed air may be in direct contact with the water. As the vehicle is driven, it may encounter rough terrain and cause the water inside of the reservoir to move or slosh around. The sloshing water may uncover an exit port in the reservoir, which exit port communicates with a misting nozzle. The end result is that instead of continuously delivering mist, spurts of compressed air exit the misting nozzles. This splatters water over the vehicle occupants and reduces the effectiveness of the reservoir as part of the compressed air leaks out.

Thus, there is a need for a more robust misting system that can operate in rough terrain. Furthermore, there is a need for misting nozzles, particularly of the type that are mounted in the reservoir walls. Such misting nozzles should have a valve to regulate the flow of water or mist. I have been unable to find any such misting nozzles.

SUMMARY OF THE INVENTION

The present invention provides a misting nozzle for use on a vehicle having a passenger compartment. The misting system comprises a reservoir located above the passenger compartment. The reservoir is capable of containing water and compressed gas. The reservoir has a bottom wall that is horizontally sloped. The reservoir has a trough located at the bottom of the sloped bottom wall. The trough has a trough wall that is vertically sloped so as to form a console. A misting nozzle is located in the trough wall. The misting nozzle has a valve associated therewith.

In accordance with one aspect of the present invention, the vehicle has a roof over the passenger compartment. The reservoir is coupled to the roof.

In accordance with another aspect of the present invention, the misting nozzle is generally horizontally oriented so as to produce mist across an upper region of the passenger compartment.

In accordance with still another aspect of the present invention, the valve associated with the misting nozzle selectively allows for full flow mist production, partial flow mist production or no mist production.

In accordance with still another aspect of the present invention, the valve is actuated by pushing or pulling the misting nozzle.

In accordance with still another aspect of the present invention, the valve is actuated by rotating the misting nozzle.

In accordance with still another aspect of the present invention, the valve comprises a ball valve.

In accordance with still another aspect of the present invention, the compressed gas in the reservoir is in contact with the water in the reservoir.

In accordance with still another aspect of the present invention, there are plural misting nozzles, with each misting nozzle having a valve associated therewith, wherein the misting nozzles can operate independently of one another.

In accordance with still another aspect of the present invention, the reservoir is integral to the roof.

In accordance with still another aspect of the present invention, a baffle is located in the reservoir wall and adjacent to the trough. The present invention also provides a misting system for use on a vehicle having a passenger compartment. The misting system comprises a reservoir located above the passenger compartment. The reservoir is capable of containing water and compressed gas. The reservoir has a bottom wall. A misting nozzle is located in the bottom wall and is oriented so as to disperse mist into the passenger compartment. The misting nozzle has a valve associated therewith. The valve selectively allows for full flow of mist production by the misting nozzle, partial flow mist production or no flow mist production.

In accordance with one aspect of the present invention, the valve is actuated by pushing or pulling the misting nozzle.

In accordance with another aspect of the present invention, the valve is actuated by rotating the misting nozzle.

In accordance with still another aspect of the present invention, the valve comprises a ball valve.

The present invention also provides a method of cooling a passenger compartment of a vehicle. A reservoir of water is located above the passenger compartment. Compressed gas is provided in the reservoir. Water from the reservoir is released through at least one misting nozzle. The misting nozzle directs the mist across the upper portion to the passenger compartment. The flow of water through the misting nozzle is adjusted from off, partially on and full on.

BRIEF DESCRIPTION OF THE DRAWINGS

FIG. 4A shows the misting valve fully closed, FIG. 4B shows the misting nozzle partially open and FIG. 4C shows the misting nozzle fully open.

FIG. 5A shows the misting nozzle fully closed, FIG. 5B shows the misting valve partially open and FIG. 5C shows the misting valve fully open.

FIG. 6A shows the misting valve closed and FIG. 6B shows the misting nozzle opened.

DESCRIPTION OF THE PREFERRED EMBODIMENTS

In the description herein, like component parts have like reference numbers.

Figure 1:
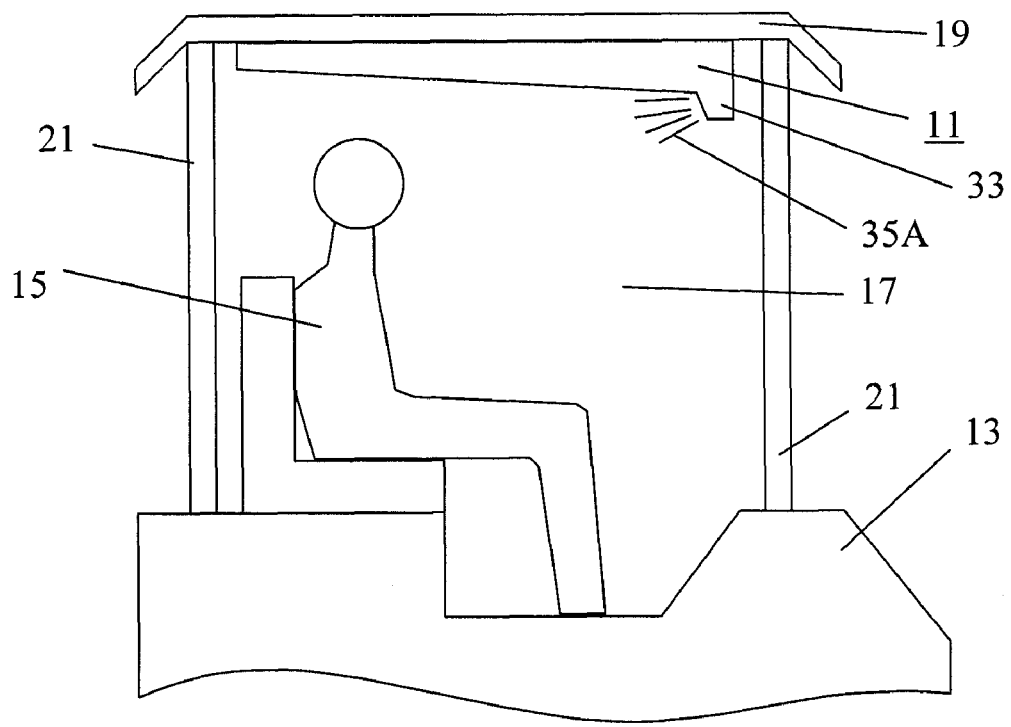
FIG. 1 is a schematic side elevational view of a vehicle with the misting system of the present invention, in accordance with a preferred embodiment.

In FIG. 1, there is shown the misting system 11 of the present invention, in accordance with a preferred embodiment, shown mounted in a vehicle 13. The misting system 11 produces one or more discharges of mist 35A onto the vehicle occupants 15. The mist is directed across the upper portions of the passenger compartment 17. This allows the mist to contact the front and sides of the head. In addition, some of the mist may experience a downward trajectory, and contact the other exposed skin of the occupants, such as the neck and arms.

The misting system 11 utilizes compressed air to drive water out through misting nozzles. The misting system 11 is designed so that as the vehicle moves roughly, for example due to traversing rough terrain, only water is produced in the mist. Compressed air, even though it may be in direct contact with the water inside of the misting system, does not exit accidentally through the nozzles.

In FIG. 1, the vehicle 13 is shown as a golf cart. The vehicle 13 can be of other types, such as a tractor, a riding lawn mower, forklift, utility cart, etc.

The golf cart 13 has a top 19 or roof and a passenger compartment 17 beneath the top. The passenger compartment of course has devices for controlling the operation in the cart, such as a steering wheel. The passenger compartment has seats for the occupants. The top 19 is supported above the passenger compartment 17 by posts 21 or supports.

The misting system 11 includes a reservoir 23 and one or more misting valves 25.

Figure 2:
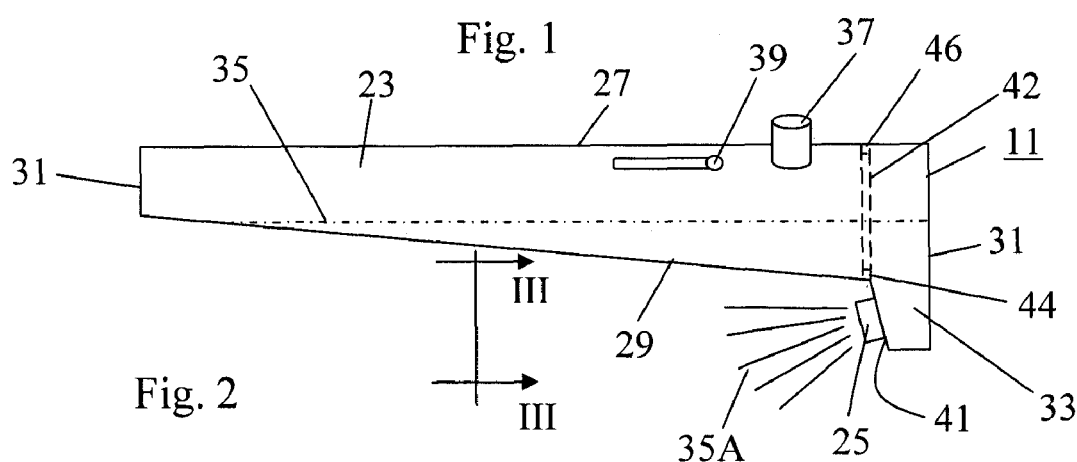
FIG. 2 is a side view of the misting system.
Figure 3:
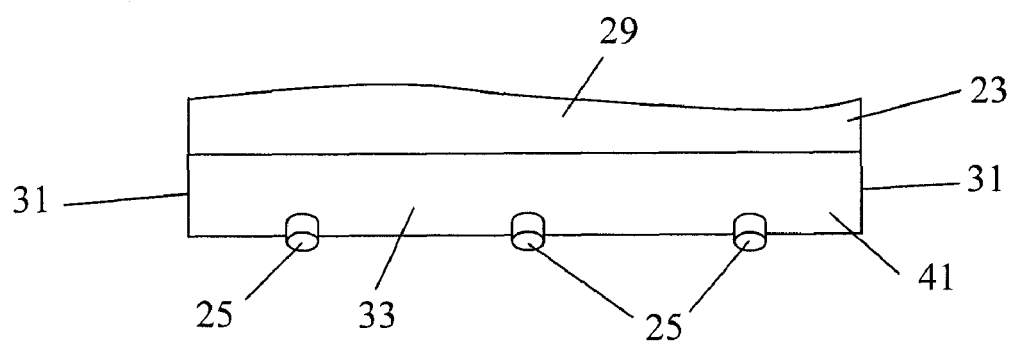
FIG. 3 is a view of the console of a reservoir, taken at lines III-III of FIG. 2.

Referring to FIGS. 2 and 3, the reservoir 11 has top, bottom and side walls 27, 29, 31 and forms an airtight and watertight container. In the preferred embodiment, the reservoir 23 is coupled to the underneath of the top 19. The bottom wall 29 in the reservoir is horizontally sloped. As shown, the bottom wall is sloped downwardly from the horizontal. At the lowest part of the bottom wall is a trough 33. The trough forms the lowermost part of the reservoir. Thus, water 35 (shown by a dashed-dotted line in FIG. 2) in the reservoir will drain into the trough 33. The size or volume of the trough relative to the size or volume of the other portions of the reservoir is small. Thus, if the volume of water in the reservoir is low, the water will still fill the trough. The reservoir 23 has a water fill spout 37. In the preferred embodiment, the spout extends out of a side wall. A cap is provided, which cap provides a watertight and airtight seal on the spout. The reservoir 23 also has a nipple 39 and an air valve for receiving a hose. Compressed air is introduced into the reservoir by the nipple 39. The reservoir 23 can be pressurized. The reservoir 23 can be a single wall object, made by, for example, rotational molding. The contour of the bottom wall 29 and the trough 33 can be seen from the exterior of the reservoir, as shown by FIGS. 2 and 3. The trough 33, when viewed from the exterior, forms a console or lip that depends from the remainder of the reservoir. When viewed by the occupants of the vehicle, the console 33 projects downwardly from the remainder of the reservoir, as can be seen by FIG. 2. The console 33 can be located along or near one edge of the reservoir. As shown in FIG. 2, the console is by the front of the reservoir. The console 33 can be located along or near other edges, such as a side edge or rear edge, or can be located along more than one edge. The console 33 can extend the entire length of an edge, shown in FIG. 3, or part of the length. The console need not be near an edge or side of the reservoir but can be located toward the center of the bottom wall 29. In all such configurations, the trough or console 33 forms the lowest part of the reservoir, with the bottom wall sloping down into the trough so that water in the reservoir drains into the trough.

The misting valves 25 are located in the console 33. The console 33 can have one, two or more misting valves 25. Each misting valve allows the flow of mist to be regulated. The misting valves are mounted in a wall 41 of a console. The console wall 41 faces rearwardly in the configuration shown in the drawings, wherein the console is located along the front edge of the reservoir. The misting valves are oriented so as to direct mist toward the occupants. In the preferred embodiment, the misting valves are oriented so that mist 35A is directed horizontally out across the upper portions of the passenger compartment 17. The console wall 41 is part of the bottom wall 29. The console wall 41, or at least the portions of the console wall 41 that receive the misting valves 25, is vertically sloped and is angled or tilted so as direct the misting nozzles 25 in the preferred direction. The misting valves can be pivotable so as to allow an occupant to point the misting nozzles in the desired direction.

Inside of the reservoir are one or more baffles 42 (shown by dashed lines in FIG. 2) that extend between the top and bottom walls 27, 29. The baffles minimize water sloshing inside of the reservoir. Each baffle 42 has several openings 44 in the bottom so as to allow water to move, albeit slowly, from one side of the baffle to the other side. In addition, each baffle has one or more openings 46 in the top so as to allow air to flow from one side to another, and allow for pressure equalization across the baffle. In the preferred embodiment, a baffle 42 is located adjacent to, and parallel to, the trough 33 so as to further reduce the ability of water to slosh out of the trough. The trough 33 thus serves to maintain water in the trough even during bumpy or rough conditions.

Because the reservoir 23 contains water and pressurized air, the misting valves 25 provide for control of the production of mist exiting the reservoir. When the valves are open, the compressed air drives water out through the misting nozzles various types of misting valves can be provided. For example, the misting valves can be of the push-pull type 25A, shown in FIGS. 4A-4C, the rotate type 25B shown in FIGS. 5A-5C or the ball type 25C shown in FIGS. 6A-6B. Each of these misting valves will be discussed in turn.

Figures 4A, 4B, 4C:
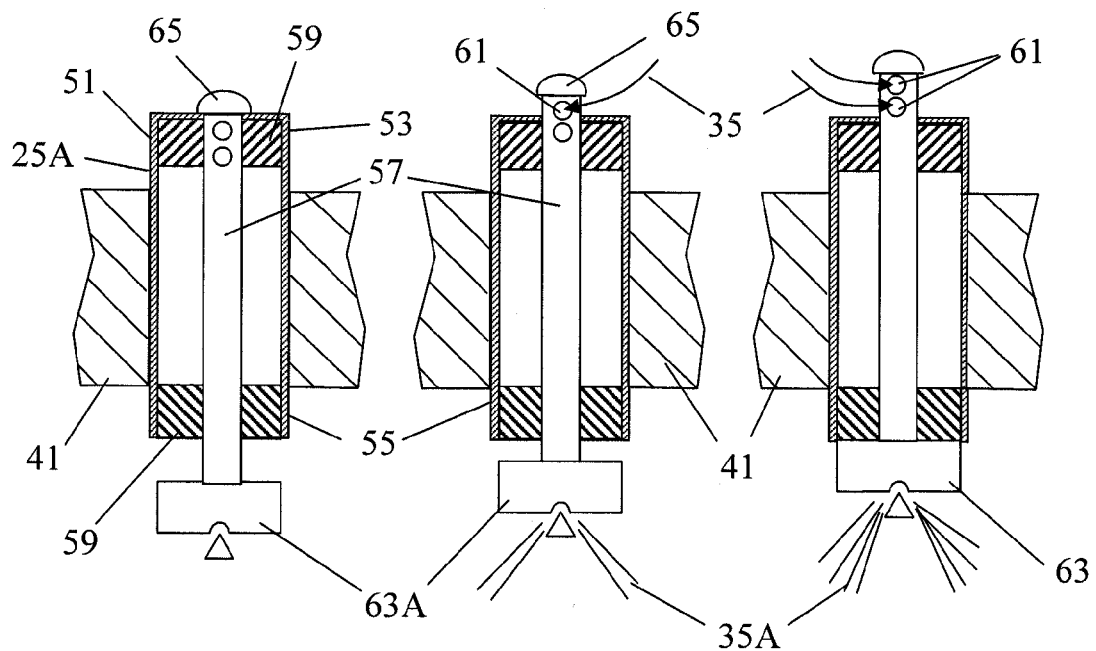
FIGS. 4A-4C are cross-sectional views of the misting valve in accordance with one embodiment.

The push-pull type 25A is shown in FIGS. 4A-4C. In FIG. 4A, the valve is closed, in FIG. 4B, the valve is partially open and in FIG. 4C, the valve is fully open. The misting valve 25A has a valve body 51 that is typically cylindrical and forms a tube. The valve body has an inner end 53 that is inside of the reservoir, exposed to the water 35, and an outer end 55. The valve body 51 receives a valve stem 57 that extends coaxially through the valve body. The valve stem 57 is supported by seals 59, one at each end of the valve body. The valve stem 57 can slide along the longitudinal axis of the valve body 51. The seals 59 are fixed in place by either an interference fit, snap rings and a stop, etc. The valve stem 57 has a passage through its length. On the inside end, the passage communicates to the interior of the reservoir by way of plural openings 61. The openings are arranged in a longitudinal manner along a portion of the length from the inside end of the valve stem toward the other end. Thus, one opening is closer to the inside end of the valve stem than the other openings. Although two openings are shown in FIGS. 4A-4C, there can be more than two openings. The other end of the valve stem is connected to a nozzle 63A. The nozzle has a passageway therethrough to allow water to flow therethrough. As water exits the nozzle 63A, it is formed into a mist 35A. Axial movement of the valve stem relative to the valve body is limited by a stop 65 on the inside end and the nozzle 63A on the outside end. The valve body 51 is inserted into the console wall 41. The valve body can be threaded into or pressed into the wall 41. A sealant is used around the valve body to provide a watertight seal.

To operate the misting nozzle 25A, as shown in FIG. 4, the nozzle 63A is pulled out from the console wall to the closed position. The openings are located within the inner seal 59 and water from the reservoir is prevented from flowing into the valve stem. To open the misting valve, the misting nozzle 63A and the valve stem 57 are pushed toward the reservoir shown in FIG. 4B. At least one of the openings 61 is now exposed to the water in the reservoir, wherein water can flow through the valve stem and exit through the nozzle as mist. The nozzle 63A is still spaced from the valve body 51, and only one (or some) of the openings is exposed to water in the reservoir. Thus, the misting valve is partially open in the configuration shown in FIG. 4B. The flow of mist can be increased by moving the nozzle into the full open position shown in FIG. 4C, wherein the nozzle 63A abuts the end of the valve body 51 and is stopped from further movement and all openings 61 of the valve stem are exposed to the water in the reservoir. Maximum water flow through the valve stem is achieved and consequently mist production is at its highest. To reduce the production of mist, the nozzle 63A is pulled back out away from the console wall 41 to either partially open position or closed position.

Figures 5A, 5B, 5C:
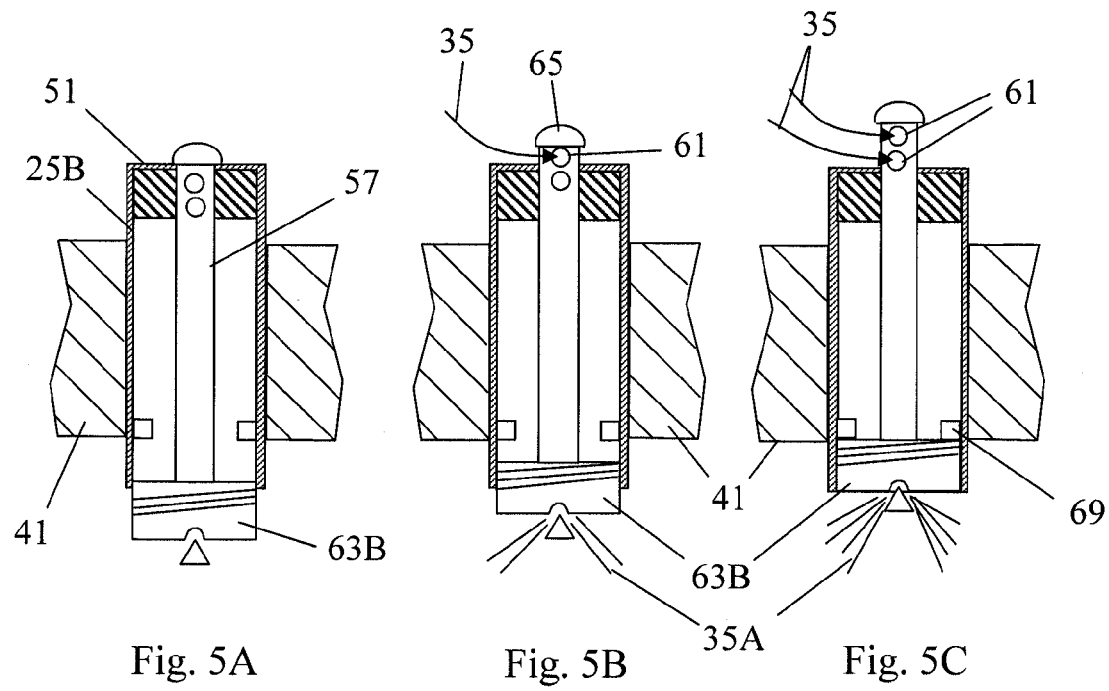
FIGS. 5A-5C are cross-sectional views of the misting valve in accordance with another embodiment.

Although the misting nozzle shown is fully outside the valve body, it can partially inside the valve body as shown in FIGS. 5A-5C.

FIGS. 5A-5C illustrate another type of misting valve 25B, namely the rotating type. The misting valve 25B is substantially similar to the misting valve 25A of FIGS. 4A-4C, with the exception of how the misting nozzle 63B interacts with the valve body 51. The misting nozzle 63B is threaded into the outer end of the valve body 51. To move the valve stem in and out, the misting nozzle 63B is turned or rotated. FIG. 5A shows the misting valve in the closed position. The nozzle is rotated in to partially open the valve, shown in FIG. 5B. The nozzle is rotated further to fully open the valve, shown in FIG. 5C. A stop 69 inside the valve body is provided to limit the inward movement of the nozzle. No outer seal is provided in the misting valve because the nozzle is received by the valve body and serves to support and position the valve stem within the valve body.

Figures 6A, 6B:
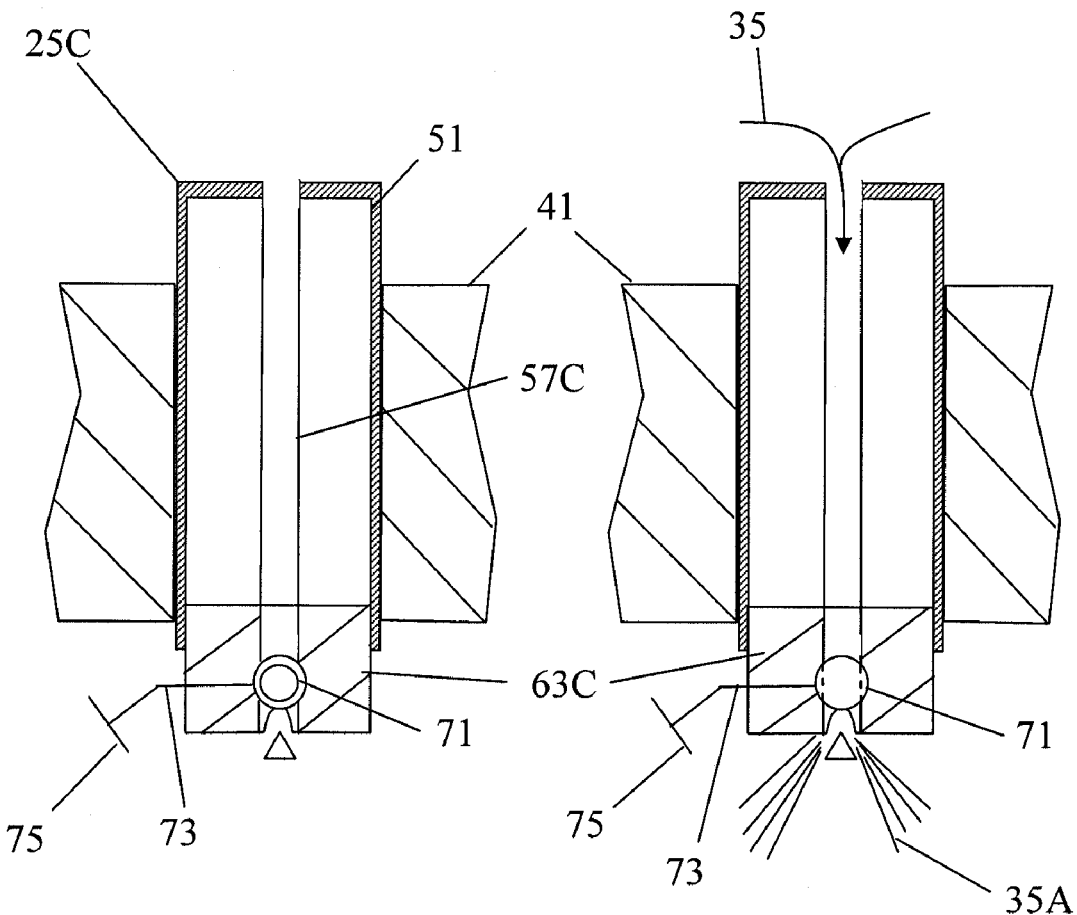
FIGS. 6A and 6B are cross-sectional views of the misting valve in accordance with another embodiment.

A ball type misting valve 25C is shown in FIGS. 6A and 6B. The valve stem 57C is fixed and need not move with respect to the valve body 51. The valve stem 57C extends from the inner end of the valve body, where the valve stem is open to the reservoir interior, to the misting nozzle 63C, located at the outer end of the valve body. The misting nozzle 63C is also fixed with respect to the valve body. Inside of the passage is a ball valve 71. The ball valve can rotate within the passage between a closed position (see FIG. 6A) and an open position (see FIG. 6B). A stem 73 and handle 75 allow the rotation of the ball valve within the passage; the stem and handle extend to the exterior of the misting valve for physical manipulation by a user. The ball valve 71 allows the production of mist to be regulated or controlled. By partially opening the ball valve, the amount of mist produced is less than when the ball valve is fully opened.

The operation of the misting system 11 will now be described. Water is put into the reservoir 23 by way of the fill spout 37. Preferably, the reservoir 23 is not completely filled with water in order to allow for a volume of compressed gas. The location of the fill spout can be such that once the water in the reservoir reaches a predetermined level, any access water exits through the spout. The cap is replaced on the spout 37 to make the reservoir airtight. Then, a compressed air supply is connected to the nipple 39 and compressed air is provided into the reservoir, within a predetermined pressure range. The compressed air supply is then disconnected to the reservoir and is now ready to use.

To use, an occupant of the passenger compartment 17 can simply reach up and open a misting valve 25 to produce mist. For example, the misting valve 25A of FIGS. 4A-4C is manipulated by pushing the misting nozzle 63A in or out. The misting valve 25B of FIGS. 5A-5C is manipulated by rotating the misting nozzle 63B. The misting valve 25C of FIGS. 6A-6B is manipulated by the stem and handle 73, 75.

One disadvantage of prior art misting nozzles is that the nozzles operate either full on or off. There is no way to regulate or control the amount of mist produced. With the misting nozzles of the present invention, the operator or passenger can regulate the amount of mist produced by moving the misting nozzle to the appropriate position. If something less than full mist production is desired, then the valve is partially opened.

Because each misting nozzle 63A, 63B, 63C has a valve associated therewith, each misting nozzle can be regulated or controlled independently of the other nozzles. Thus, one occupant may desire more or less mist than the other occupant of the vehicle.

Another disadvantage of prior art misting systems is the propensity to starve the misting nozzles of water when the vehicle bounces or traverses rough terrain, as is commonly found on golf courses and elsewhere. When the misting nozzles are starved of water, compressed air is leaked out. This spews water onto the occupants and reduces the charge of compressed air to expel water. With the present invention, the misting nozzles are located in trough 33, where a relatively small amount of water is located and concentrated. There is less tendency for the water in the trough to slosh out and expose the misting nozzles to compressed air.

Furthermore, the trough serves as a console to position the misting valves 25. Instead of pointing down, where the mist is directed down, mounting the misting valves on the console, which console has a vertically inclined wall 41, allows the production of mist to be directed more horizontally, across the upper airs of the passenger compartment. This allows for more effective cooling of the occupants.

Although the trough wall 41 has been described and shown as a flat wall, it not need be a flat wall but can be curved. Furthermore, the misting system has been described as using compressed air. However, other compressed gasses could be used.

Figure 7:
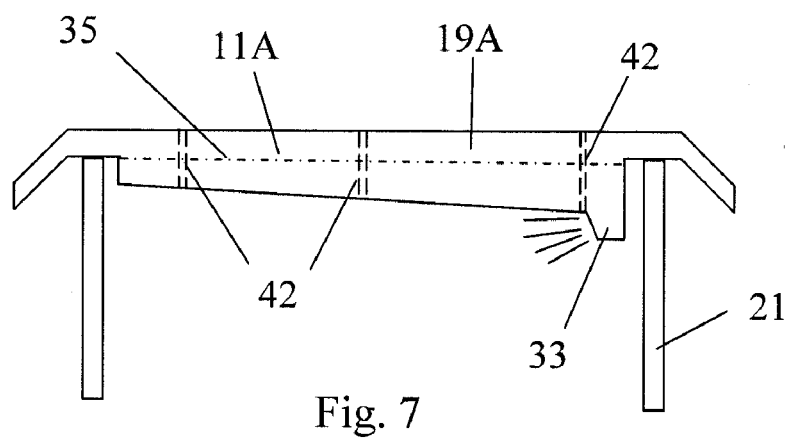
FIG. 7 is a side elevational view of the roof of a vehicle, with the reservoir integral therein.

Although the reservoir has been described as being coupled to the roof, the roof and the reservoir can be a single unit with the reservoir built into the roof. This is shown in FIG. 7, where the roof 19A has an integral reservoir 11A. The reservoir is formed in the roof, wherein the roof can hold a quantity of water and compressed air. Baffles 44 provide structural support. Portions of the roof, such as the eaves, that do not drain into the trough 33 can be blocked to water, such as by inside walls.

The foregoing disclosure and showings made in the drawings are merely illustrative of the principles of this invention and are not to be interpreted in a limiting sense.

The invention claimed is:
1. A misting system for use on a vehicle having a passenger compartment, comprising:
 a) a reservoir located above the passenger compartment, the reservoir capable of containing water and compressed gas, the reservoir having a bottom wall that is horizontally sloped, the reservoir having a trough located at a bottom of the sloped bottom wall;

b) the trough having a trough wall that is vertically sloped so as to form a console;

c) a misting nozzle located in the trough wall, the misting nozzle having a valve associated therewith.

2. The misting system of claim 1, wherein the vehicle has a roof over the passenger compartment, the reservoir being coupled to the roof.

3. The misting system of claim 1, wherein the misting nozzle is generally horizontally oriented so as to produce mist across an upper region of the passenger compartment.

4. The misting system of claim 1, wherein the valve associated with the misting nozzles selectively allows for full flow mist production, partial flow mist production or no mist production.

5. The misting system of claim 4, wherein the valve is actuated by pushing or pulling the misting nozzle.

6. The misting system of claim 4, wherein the valve is actuated by rotating the misting nozzle.

7. The misting system of claim 4, wherein the valve comprises a ball valve.

8. The misting system of claim 1, wherein when the reservoir contains compressed gas and water, the compressed gas in the reservoir is in contact with the water.

9. The misting system of claim 1, further comprising plural misting nozzles, with each misting nozzle having a valve associate therewith, wherein the misting nozzles can operate independently of each other.

10. The misting system of claim 1, wherein:
a) the vehicle has a roof over the passenger compartment, the reservoir being coupled to the roof;
b) the misting nozzle is generally horizontally oriented so as to produce mist across an upper region of the passenger compartment;
c) the valve associated with the misting nozzles selectively allows for full flow mist production, partial flow mist production or no mist production;
d) the compressed gas in the reservoir is in contact with the water in the reservoir;
e) further comprising plural misting nozzles, with each misting nozzle having a valve associate therewith, wherein the misting nozzles can operate independently of each other.

11. The misting system of claim 1, wherein the reservoir is integral to the roof.

12. The misting system of claim 1, further comprising a baffle located in the reservoir wall and adjacent to the trough.

13. A misting system for use on a vehicle having a passenger compartment, comprising:
a) a reservoir located above the passenger compartment, the reservoir capable of containing water or compressed gas, the reservoir having a bottom wall;
b) a misting nozzle located in the bottom wall and oriented so as to disperse mist into the passenger compartment;
c) the misting nozzle having a valve associated therewith, the valve selectively allowing for full flow mist production by the misting nozzle, for partial flow mist production and for no mist production, wherein the valve is actuated by pushing or pulling the misting nozzle.

* * * * *